United States Patent [19]

Cordes et al.

[11] Patent Number: 4,525,183
[45] Date of Patent: Jun. 25, 1985

[54] VALVES FOR DESICCANT DRYERS

[75] Inventors: Harry D. Cordes; Thomas G. Haberer; Marcel G. Verrando, III, all of Ocala, Fla.

[73] Assignee: Pall Corporation, Glen Cove, N.Y.

[21] Appl. No.: 551,560

[22] Filed: Nov. 17, 1983

Related U.S. Application Data

[63] Continuation-in-part of Ser. No. 444,717, Nov. 26, 1982, abandoned.

[51] Int. Cl.³ .............................................. B01D 53/04
[52] U.S. Cl. .................................... 55/179; 55/387; 137/543.15; 251/63; 251/63.5
[58] Field of Search ............ 55/21, 33, 74, 163, 55/179, 387; 137/512, 543.15, 625.66; 251/63, 63.5

[56] References Cited

U.S. PATENT DOCUMENTS

| | | | |
|---|---|---|---|
| 368,209 | 8/1887 | Hastings | 137/625.66 |
| 737,273 | 8/1903 | Reynolds | 137/625.5 |
| 843,391 | 2/1907 | Ferris | 251/63 |
| 1,239,617 | 9/1917 | Newcombe | 251/63 X |
| 1,575,771 | 3/1926 | King | 137/625.5 |
| 2,020,773 | 11/1935 | Ernst | 251/63 |
| 2,274,308 | 2/1942 | Tschanz | 137/512 X |
| 2,759,699 | 8/1956 | Rush | 251/63.5 |
| 2,934,080 | 4/1960 | Rice | 137/512 X |
| 2,957,457 | 10/1960 | Rabjohn | 137/625.66 |
| 3,102,553 | 9/1963 | Ottestad | 251/63.5 X |
| 3,301,274 | 1/1967 | Kenney | 137/625.66 |
| 3,410,309 | 11/1968 | Ludwig | 137/625.66 |
| 3,532,120 | 10/1970 | Beahm et al. | 137/609 |
| 3,533,446 | 10/1970 | Kirk | 137/625.66 |
| 3,608,587 | 9/1971 | Zbell | 137/625.66 |
| 3,610,285 | 10/1971 | Passagglo | 137/625.66 |
| 3,761,051 | 9/1973 | Cagle | 251/63.5 X |
| 3,779,280 | 12/1973 | Evans et al. | 137/625.5 |
| 3,805,825 | 4/1974 | Lovingham | 137/512 |
| 4,014,510 | 3/1977 | Smith | 251/63 |
| 4,162,146 | 7/1979 | Seibert | 55/163 |
| 4,232,704 | 11/1980 | Becker et al. | 137/512 X |
| 4,247,311 | 1/1981 | Seibert et al. | 55/163 X |
| 4,295,863 | 10/1981 | Lattuada | 55/21 |

FOREIGN PATENT DOCUMENTS

| | | | |
|---|---|---|---|
| 2934A/75 | 5/1975 | Italy | |
| 1462075 | 11/1977 | United Kingdom | 251/63.5 |

Primary Examiner—Robert H. Spitzer
Attorney, Agent, or Firm—Leydig, Voit, Osann, Mayer & Holt, Ltd.

[57] ABSTRACT

A series of valves are disclosed which are specially designed for use in desiccant dryers. Each of the valves utilizes a housing (12), fabricated of standard pipe components and communicating flanges (13, 14) in conjunction with a poppet (24) and seat (20) arrangement. A support (30) fixed to one side of the interior of the housing carries an axial rod (23) to which the poppets (24) are mounted. Two- and three-way valves include a piston (36) and cylinder arrangement within the support to actuate the poppets. The poppet (224) of the check valve (200) is actuated automatically in response to pressure differentials across the poppet.

15 Claims, 12 Drawing Figures

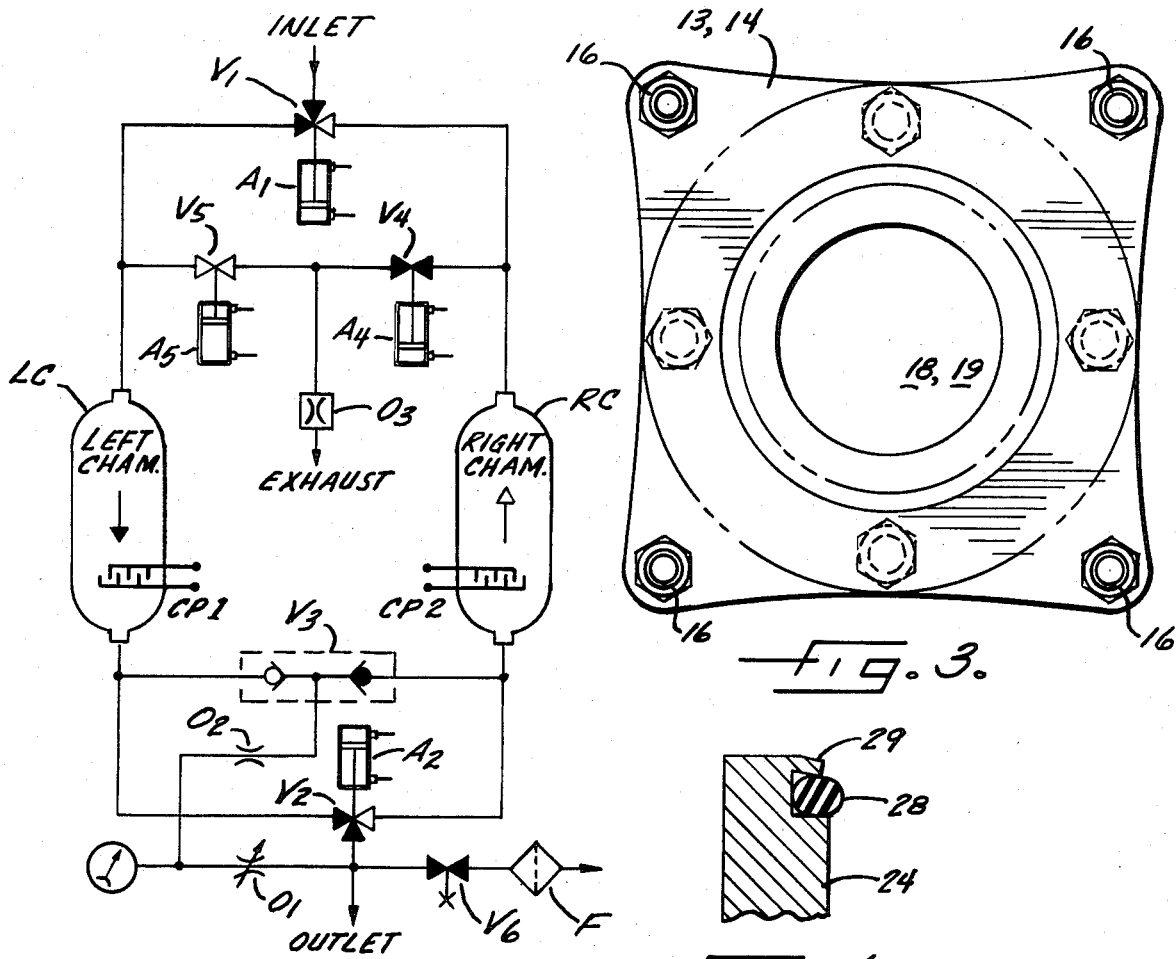
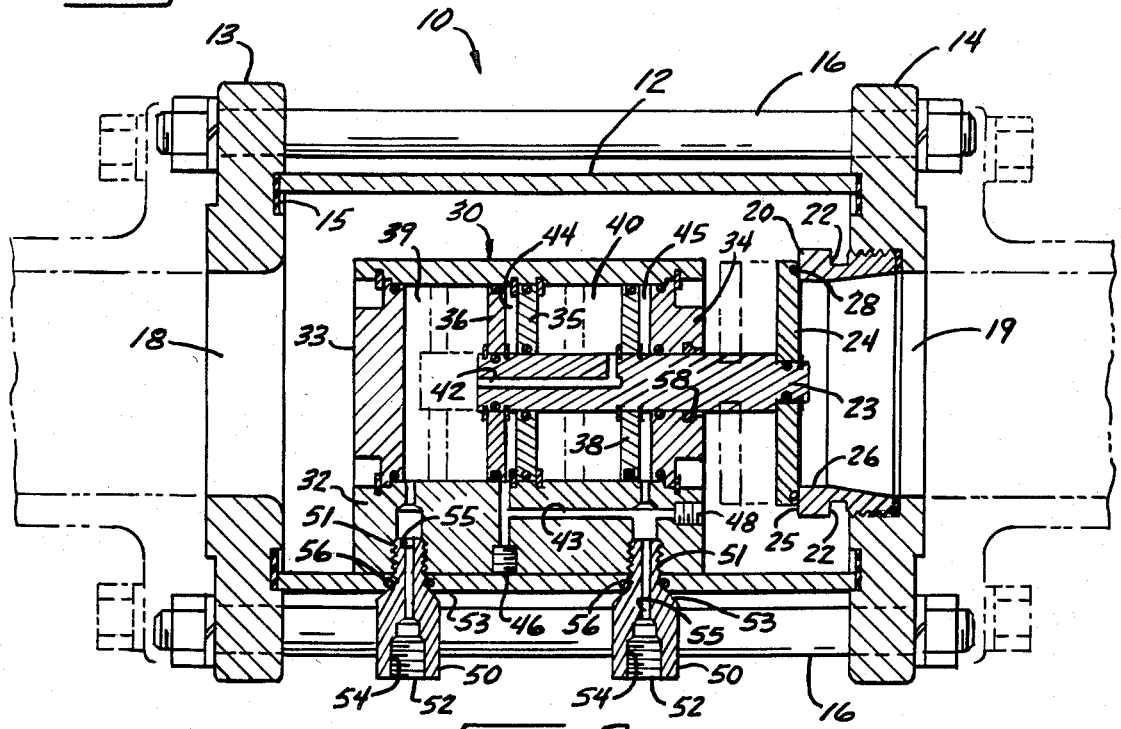

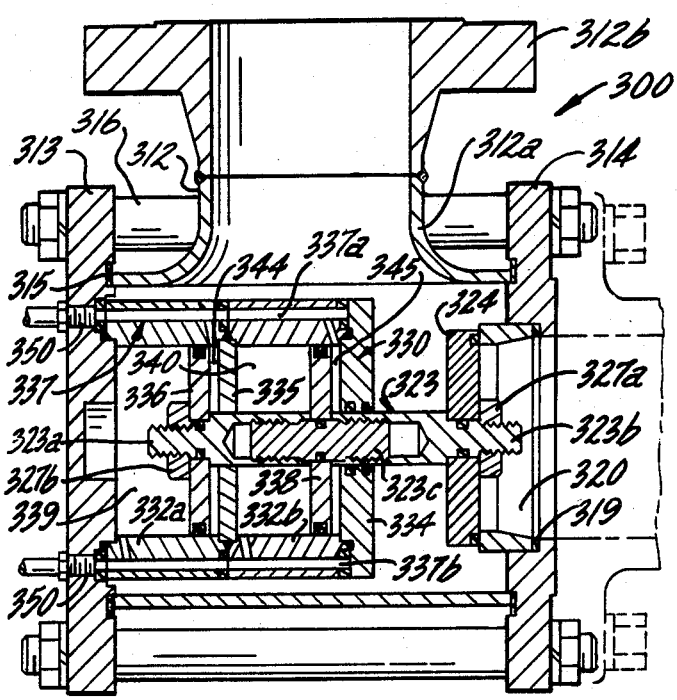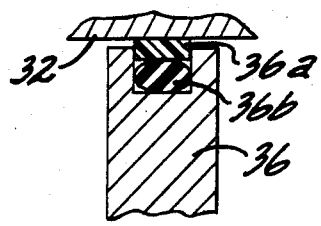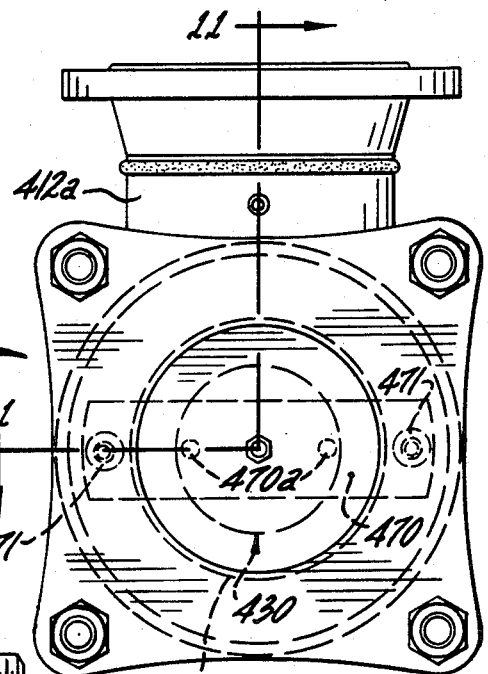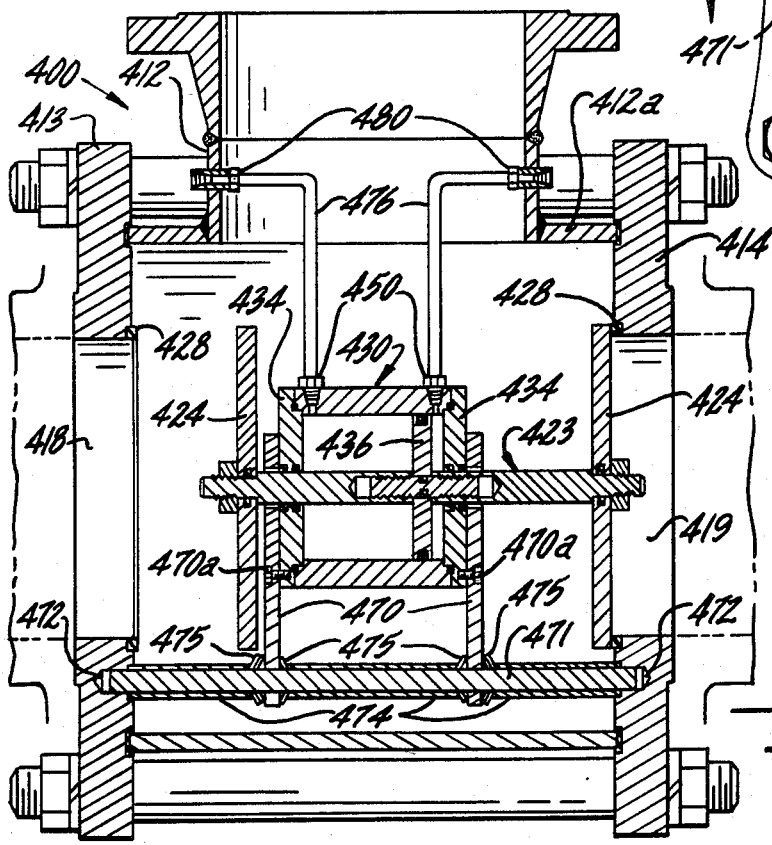

VALVES FOR DESICCANT DRYERS

RELATED APPLICATIONS

This application is a continuation-in-part of our co-pending U.S. application, Ser. No. 444,717, filed Nov. 26, 1982, now abandoned.

TECHNICAL FIELD

This invention relates to valves used to control the flow of fluids, and more particularly, to valves used in compressed gas desiccant dryer systems.

BACKGROUND ART

As is easily appreciated, there are many uses for compressed gas which are better performed if the gas is clean and dry. For example, moist air used in conjunction with pneumatic instruments, controls and tools can cause corrosion and malfunction; or if moist air is used when spraying paints and coatings, surface blemishes may result. In such applications, it is well known to utilize compressed air drying systems comprising two beds of a desiccant material. One bed adsorbs moisture from the compressed gas at operating pressure, while the other bed is in a regeneration phase, usually at atmospheric pressure. The size of the pipe used in high capacity drying systems can be three or more inches in diameter, with rotating plug-type and ball-type valves being widely used in conjunction with such large drying systems. It will be appreciated that such valves must be quite bulky and expensive to accommodate the flow without undue pressure drops and also require proportionately large and expensive actuators. In addition, the severe conditions, which range from moist, inlet air to very dry and possibly dusty purge and effluent air, have been found to adversely affect the life and operation of such valves.

Thus, it is the principal object of the present invention to provide valves specifically designed for use in desiccant drying systems and which are less bulky and expensive than many.

A further object is to provide a family of valves for use in desiccant drying systems wherein each of the different types of valves utilizes common or similar components.

BRIEF DESCRIPTION OF THE DRAWINGS

Other objects and advantages of the invention will become apparent upon reading the following detailed description and upon reference to the drawings, in which:

FIG. 1 is a schematic view of a desiccant dryer system in which the valves of the present invention may be utilized;

FIG. 2 is a cross-sectional view of a two-way valve embodying the present invention for use in the drying system of FIG. 1;

FIG. 3 is an end view of the two-way valve of FIG. 2;

FIG. 4 is a view of the poppet edge enlarged to show detail;

FIG. 9 is a cross-sectional view of an alternate embodiment of a two-way valve;

FIG. 10 is an end view of an alternate embodiment of a three-way valve;

FIG. 11 is an offset sectional view taken substantially along line 11—11 in FIG. 10; and FIG. 12 is a view of a piston edge enlarged to show detail.

Figures 5, 6:
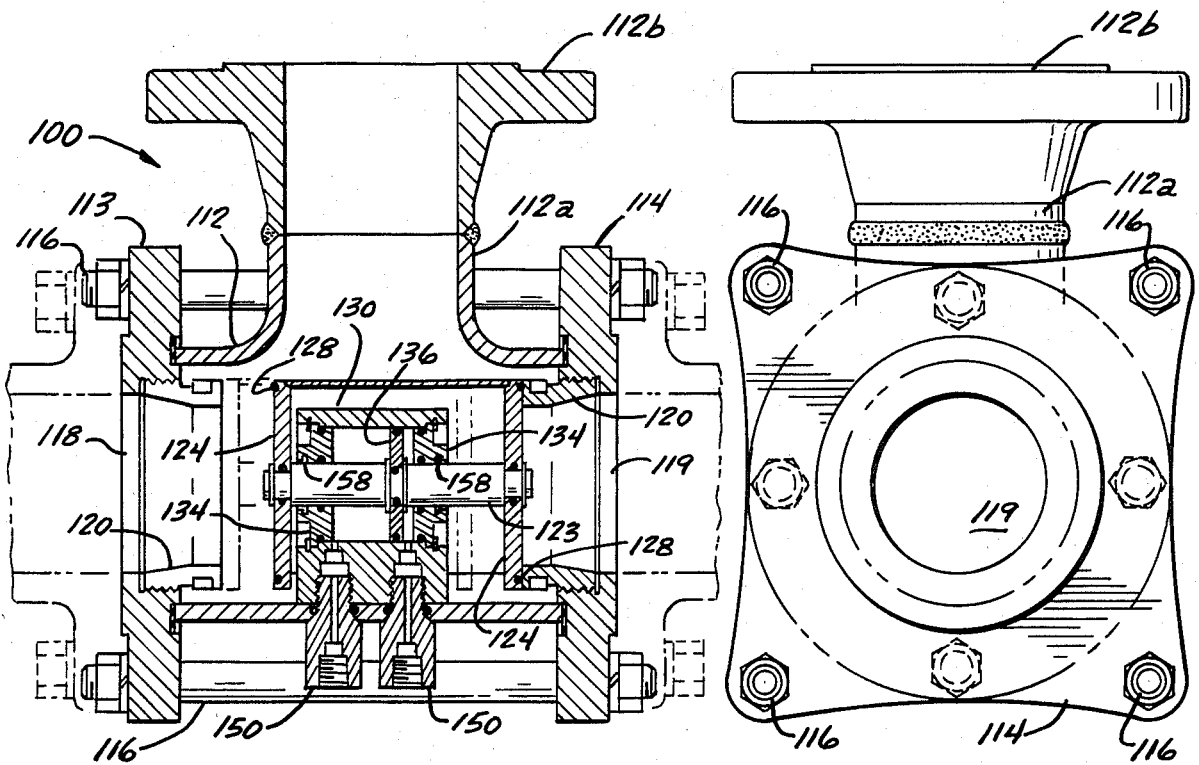
FIG. 5 is a cross-sectional view of a three-way valve.
FIG. 6 is an end view of the three-way valve of FIG. 4.

While the invention will be described in connection with certain preferred embodiments, it will be understood that it is not intended to limit the invention to these embodiments. On the contrary, it is intended to cover all alternatives, modifications and equivalents as may be included within the spirit and scope of the invention as defined by the appended claims.

INDUSTRIAL APPLICABILITY

Turning now to FIG. 1, there is shown a schematic diagram of an internal heat reactivated compressed air desiccant dryer in which the valves of the instant invention may be utilized. This specific type of dryer has been chosen for illustrative purposes only inasmuch as the valves of the present invention may be advantageously employed with virtually any type of large dryer, including heaterless, external heat reactivated and closed loop systems.

In operation, in the portion of the cycle illustrated in which the left chamber LC is drying and the right chamber RC is being regenerated, wet compressed gas is admitted into the inlet and directed downward through V1, a three-way valve, toward the left chamber LC, which contains desiccant such as activated alumina or silica gel. The wet gas contacts the desiccant and gas drying takes place by the well known adsorption process. In the system shown, the drying cycle continues until a predetermined moisture loading of the desiccant is attained, as determined, for example, through the use of a capacitance probe CP1 as disclosed in copending U.S. application Ser. No. 267,964, filed May 27, 1981.

Dry gas exits the left chamber and passes through three-way valve V2 to the outlet and continues to the application or work area. At the outlet, a portion of the pressurized dryed gas is tapped off as purge gas for regeneration purposes. This purge gas is returned to the depressurized regenerating right chamber RC through orifices O1 and O2 and a dual check valve V3. In the illustrated cycle, the dried gas passes through V3 to the right desiccant chamber RC, which has been loaded with moisture in a previous cycle, to regenerate the desiccant. It will be appreciated that this gas flow results as a consequence of the right chamber RC having been depressurized from operating pressure to atmospheric pressure at the beginning of the regeneration cycle by two-way valve V4. The depressurization gas and the purge gas are exhausted to atmosphere through the open valve V4 and the orifice O3.

When regeneration is complete, the right chamber is repressurized to full operating pressure by closing the two-way valve V4. Gas continues to flow into the chamber until the pressure rises to system pressure. Inlet gas is then switched over to flow through three-way valve V1 to the right chamber to perform the right-chamber-drying/left-chamber-regenerating portion of the cycle which mirrors the portion of the cycle shown.

DISCLOSURE OF THE INVENTION

Such a drying system requires several types of flow control valves. In the embodiment of FIG. 1, these are three-way valves V1 and V2, check valve V3 and two-way valves V4 and V5. According to the present invention, a pneumatically controlled valve of each of these types has been specially designed for use in dryers, with each of the valves being similar in construction to one another. For example, each of the three valves utilizes standard industrial grade pipe sections and fittings for the basic valve housing. These pipe sections require only limited machining to adapt them as valve components. Each valve employs a common oversized flange at its openings to provide an interface between the valve housing and the drying system. The flanges are secured to the valve housing by tie rods which allow relatively quick and easy breakdown of the valve for servicing and maintenance.

Similar internal components including movable discs or poppets carried by axial rods are used in each of the valves. The poppets cooperate with annular seats to create face-to-face, rather than circumferential seals. Thus, no lubricant is needed between the disc and seat members. In general, these and other features of the inventive valves discussed below result in valves which are not only longer lived and easier to maintain and service than the predecessor valves, but are also economical to manufacture.

BEST MODES FOR CARRYING OUT THE INVENTION

Turning to FIGS. 2 and 3, the two-way valve 10 has a valve housing 12 constructed of a hollow cylindrical member, such as a section of pipe, having flanges 13, 14 held on the opposite open ends by means of tie rod assemblies shown as items 16. Gaskets 15 between the ends of the housing 12 and the flanges 13 and 14 create a seal between the members. The housing 12 is shown with an inside diameter of somewhat greater than inside diameter of the pipe of the drying system into which the valve is incorporated. For example, a section of 4 inch pipe might be employed for a valve which is to be incorporated into a 3 inch line. As best seen in FIG. 3, the flanges 13, 14 are generally square in configuration, with the "corners" allowing the tie rods 16 to be spaced sufficiently far apart to allow the valve 10 to mate with standard pipe flanges (shown in phantom in FIGS. 2 and 3). It will be appreciated that this arrangement permits the valve to be slidably inserted or removed from the drying system through removal of only one of the four tie rods 16.

Flanges 13, 14 have central openings 18 and 19, respectively, to allow for the passage of gas therethrough. Flange 14 further has a seat 20 disposed therein. In the embodiment shown the seat 20 is threaded into the flange 14. The seat 20 may be provided with holes 22 to facilitate installation with a spanner wrench. The seat extends inwardly of the flange 14 and has a bore therethrough of substantially the same size as the inside diameter of the pipe with which the valve is designed to mate. A rod 23 is axially aligned with the seat 20 and has secured thereto a disc-like sealing member 24. The rod 23 is movable so that the face of the sealing disc 24 can be moved into and out of contact with the inwardly-directed face edge 25 of the seat 20. In the position shown the disc 24 is in contact with the face 25, thereby "closing" the valve. With the disc 24 spaced from the seat 20 (as shown in phantom) the gas is free to pass between the annular opening 26 created between the periphery of the disc and the internal wall of the housing. In order to avoid either excessive pressure drops or excessive expansion, the housing 12 and disc 24 should be sized such that the cross-sectional area of the annular opening 26 approximates that of the seat 20 and the pipe with which the valve 10 is used. In the embodiment shown the inside diameter of the seat 20 decreases slightly at the face 25 to permit the use of a smaller disc 24, to permit the use of a smaller diameter housing 12 that might otherwise be required.

The face of the sealing disc 24 may be provided with a resilient sealing material, such as the O-ring 28 illustrated, to insure positive sealing contact between the disc 24 and the seat 20. In the embodiment shown the O-ring is held in place in an annular groove machined into the face of the disc 24. As illustrated in FIG. 4, if the groove is formed sufficiently close to the edge of the disc 24 the resultant annular lip 29 may be deformed inwardly, with the O-ring 28 in place, as with a spinning operation, to "dove-tail" it in the groove. Other sealing systems might be employed, including fixing a resilient material to the face 25 of the seat 20.

As illustrated in FIG. 2, a support subassembly 30 is comprised of a main body 32 with an axial bore into which end caps 33 and 34 are sealed and secured with O-rings and snap rings (except these O-rings and snap rings, along with others noted below, are shown but not specifically identified in the FIGURES). In addition, a partition 35 is sealed and secured centrally in the bore. End cap 33 is blind, while both end cap 34 and partition 35 have axial bores through which the rod 23 passes. O-rings at the bores of both the partition 34 and the end cap 35 create sliding seals. Pistons 36 and 38 are shown sealed and secured to the rod, one on each side of the partition 35. O-rings at the outer peripheries of the pistons 36 and 38 slidingly seal against the bore in the support body 32. The pistons 36 and 38 are located on the rod 23 and spaced from one another such that they may be selectively pneumatically driven in tandem to move the disc 24 between the position shown in solid lines and that shown in dotted lines in FIG. 2. The tandem operation is effected by interconnecting chamber 39 and 40 with a passageway 42 through the rod 22. Similarly a passageway 43 in the support subassembly body 32 interconnects chamber portions 44 and 45. In this regard plugs 46 and 48 are shown sealing off holes through the body 32 which it is contemplated will be generated in forming the passageway 43.

According to an aspect of the present invention, in the embodiment shown the same members 50 which secure the support subassembly 30 to the housing 12 also serve as the ports through which pneumatic control signals may be introduced into the chamber portions 39 and 40, on the one hand, and chamber portions 44 and 45, on the other hand. The upper ends 51 of the members 50 are externally threaded, while the lower ends 52 may have a square, hexagonal or other convenient cross section which accommodates direct tightening using a wrench. The transition section 53 between the upper threaded portion 51 and the lower portion 52 is shown to be conical, such that this surface can cooperate with mating recesses in the housing 12 to assure the proper orientation of the support subassembly 30 relative to the housing when the members 50 are tightened. Internal threads 54 at the lower ends 52, accommodate the connection of pneumatic control lines (not shown), with axial bores 55 through the members 50 communicating with the respective pairs of chambers discussed above. O-rings 56 are provided to create a seal between the three pressure levels which might exist at that location at any given time; viz., the ambient pressure external to the valve, the system pressure of the gas surrounding the support subassembly 30, and the pneumatic control pressures supplied through the members 50.

The various components of the valve disclosed above should be made of materials which will resist corrosion and, where sliding contact occurs, have acceptably low coefficients of friction. Stainless steel has been found suitable for the seat 20, the rod 23, the disc 24, the end caps 33 and 34 and the pistons 36 and 38. The support body 32 may be made of Teflon-coated carbon steel, with the Teflon serving the dual functions of protecting against corrosion and reducing the sliding friction of the piston O-rings along the pneumatic chamber bore. The rod 23 may also be Teflon-coated to minimize friction between its external surface and the O-rings of the end cap 34 and of the partition 35. In addition, a wiper 58 may be employed near the outer surface of the end cap 34 to wipe the rod 23 free of desiccant dust or other dirt and impurities which may be adhering to it as it is withdrawn into the support 30. It is noted that, while Viton O-rings have been used successfully throughout in valves which have been tested to date, in those areas where the O-rings are in sliding contact with Teflon surfaces (e.g., at the peripheries of the pistons 36 and 38 and where the rod 23 passes through the end cap 34 and the partition 35), Teflon-impregnated O-rings may be utilized to further reduce friction and wear. Alternatively, a continuous Teflon glide ring 36a, urged outwardly from the periphery of the piston 36 into contact with the wall of the support body 32 by means of an elastomeric O-ring 36b, may be advantageously used (see FIG. 12).

From the above discussion of the two-way valve 10 it will be appreciated that tandem piston arrangement effectively doubles the actuation force which a given pneumatic control signal would give as compared with the actuation force achievable with a single piston of the same size. With such an arrangement, for a given pneumatic control pressure, the size of the support subassembly 30 can be smaller relative to the size of the disc 24 than would be possible with a single stage system. For the purposes of illustration, the ratios of the sum of the areas of the pistons 36 and 38 to the area of the disc 24 for an actual valve of the type shown in FIG. 2 designed for use with 3 inch pipe has been calculated to be about 1.4:1. The corresponding ratios for similar series of valves designed for use with pipe sizes of 4 to 8 inches ranged between about 1.6:1 to 1.2:1. Given this range of ratios, it will be appreciated that the application of full system pressure as one pneumatic control signal, with the other signal at ambient pressure, will be sufficient to operate the valve with a full system pressure differential across the poppet. This, of course, is the pressure differential against which the valve must operate when employed as an exhaust valve V4 or V5 in FIG. 1. A control system particularly suited for the control of the valves of this present invention in the context of heaterless dryers is disclosed in copending U.S. application Ser. No. 444,502, filed Nov. 24, 1982. The pneumatic supply for such a control system may be tapped off from the outlet line, as shown in FIG. 1, wherein the pneumatic supply passes through shut-off valve V6 and filter F. The pneumatic control signals are shown returning to actuators A1, A2, A4 and A5 associated with valves V1, V2, V4 and V5, respectively. The control of three-way valves V1 and V2, as well as the absence of a control for V3, are discussed below.

As a final point, it will be appreciated that the two-way valve 10 discussed above may be used in either a "normally open" or a "normally closed" manner depending upon the orientation of the pressure drop across the valve. By way of illustration, if the valve, in the orientation shown in FIG. 2, were used in the position of V4 in FIG. 1, the port 18 would always be at or near ambient, with any pressure in the right chamber RC tending to open the valve. If, on the other hand, the valve 10 were used in the position of V5 in FIG. 1, without changing its orientation from that shown in FIG. 2, any pressure in the left chamber LC would tend to keep the valve closed. With such arrangement, as shown in FIG. 1, only one pneumatic control signal at the appropriate member 50 is required, with the other member 50 being vented to atmosphere.

Turning now to FIGS. 5 and 6, a three-way valve 100 according to the invention and suitable for use at either the V1 or V2 location in FIG. 1 is shown. Components similar in configuration or function to components employed in the two-way valve 10 are assigned corresponding numbers in the 100-series. Except where otherwise noted, the construction and materials used may be the same as described above in conjunction with the two-way valve 10. As shown, the valve housing 112 is comprised of a standard tee-section 112a, to the branch of which is welded a conventional weld-neck flange 112b. A seal and poppet arrangement in the valve 100 differs from that of the two-way valve 10 described above primarily in that both the flange 113 and the flange 114 have a seat 120 disposed therein, with a rod 123 carrying a disc 124 at each end. In the embodiment shown a single piston 136 is secured to the rod 123 at its midpoint and can be selectively driven back and forth with pneumatic signals at the members 150 to close off the opening through one or the other of seats 120. As with the two-way valve 10, a support 130 may be provided with wipers 158 in the end caps 134 to wipe contaminants such as desiccant dust from the rod 123.

In the normal course of using the three-way valve 100 of the present invention in the V1 position of FIG. 1, significant pressure drops should not be present across either of the discs 124 at the time valve actuation occurs since both of the desiccant chambers LC and RC should be at or near full system pressure. Similarly, for the same reason in the normal course of using a three-way valve 100 in the V2 position of FIG. 1, significant pressure differentials should not be established across the discs 124. Accordingly, less pressure differential between the pneumatic control signals will be required to actuate the three-way valve 100 when used in either the V1 or V2 position than was the case with the two-way valve 10 described above when employed in either the V4 or V5 position.

Accordingly, a single-stage piston arrangement, as compared to the tandem arrangement of the two-way valve, may be employed. By way of illustration, a valve designed for use in three inch lines, which employs a 3-inch brance, 4-inch run, pipe section 112a, has been calculated to have a piston area to disc area ratio of about 0.35. The corresponding ratios for valves of similar design for use in lines ranging from 4 to 10 inches have been calculated to range between about 0.34 and 0.40. Accordingly, the use of full system pressure as one pneumatic control signal, with the other vented to atmosphere will be adequate to actuate the three-way valves throughout the range of contemplated operating conditions. The previously identified copending application Ser. No. 444,502 describes a control system suitable for use with heaterless dryers employing the three-way valves of the present invention. As shown schematically in FIG. 1, two pneumatic control signals are required from such a control system, one at each member 150. Inasmuch as valves V1 and V2 act in unison, the corresponding signals to the two valves can be tied together.

Figures 7, 8:
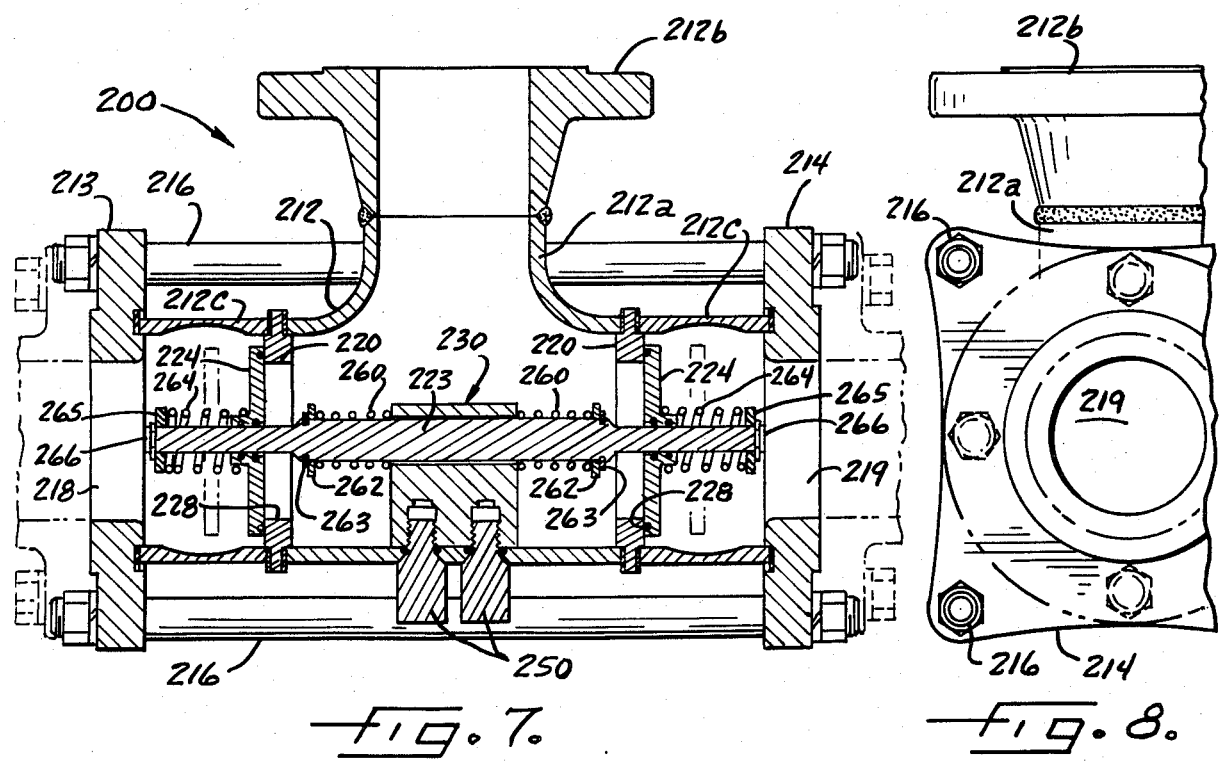
FIG. 7 is a cross-sectional view of a dual check valve.
FIG. 8 is an end view of the dual check valve of FIG. 6.

Turning now to FIGS. 7 and 8, there is shown a check valve 200 embodying the present invention. Again components similar in configuration or function to those of the valves described above are assigned corresponding 200-series numbers. The check valve is provided with a housing portion 212 generally similar to that employed in the three-way valve described above. Specifically, the central portion of the housing includes a standard pipe tee 212a to the branch which is welded a conventional weld-neck flange 212b. Seats 220 are provided at each end of the central housing portion. The housing 212 further includes cylindrical extensions 212c outboard of the seats 220. As shown in FIG. 7, the inside surfaces of the extensions 212c may be contoured to increase the annular passage around the discs 224 when they are in their "open" position (shown in phantom). The central housing portion 212a, seats 220, cylindrical extensions 212c and flanges 213 and 214 are sealingly secured together, with gaskets between the adjacent components by means of tie rod assemblies 216 extending through the two end plates. The flanges 213 and 214 are further provided with central openings 218 and 219, respectively, to permit the passage of gas therethrough. The two seats 220 each have central openings of substantially the same cross-sectional area as the openings 218 and 219 in the flanges 213 and 214.

A support 230 is secured to the interior of the central housing portion 212a by means of threaded members 250 insertable through the housing and removable from the exterior thereof. In contrast to the members of the two-and three-way valves discussed above, the members 250 need not be adapted for the attachment of pneumatic control lines inasmuch as the check valve is automatically actuated based on pressure levels present within the various chambers of the valves as discussed below. Slidably mounted to the support 230 is a rod 223 which extends through the openings of both seats 220 and is axially aligned therewith. In the embodiment shown the rod 223 is centered with respect to the support with a spring 260 on each side of the support. The outboard ends of the springs 260 are restrained on washer members 262 which are in turn restrained by snap rings 263.

The rod 223 carries a sealing disc 224, at each opposite end for sealing engagement with the seats 220. The sealing discs 224 are slidable along the rod 223 and are biased into sealing contact with their respective seats 220 by means of helical springs 264 disposed on the rod with their inboard ends abutting the sealing discs. The outboard ends of the springs 264 are restrained relative to the rod by washer members 265 which are in turn restrained by snap rings 266. The sealing discs 224 may also be provided with resilient O-ring gaskets 228 to insure sealing face-to-face contact between the sealing discs 224 and their respective seats 220. It is contemplated that the spring constants of the centering springs 260 be significantly higher than those of the sealing disc springs 264, with the former springs providing a shock absorption function to reduce the impact stress which might otherwise occur when one or the other of the sealing discs 224 "bottoms out" against a fully compressed spring 264.

From the above description, it will be appreciated that when the inboard-to-outboard force, due to either impulse or static pressure, on either of the sealing discs 224 exceeds the respective outboard-to-inboard force plus the force exerted by the associated spring 264, the sealing disc will be forced away from its seat 220. Otherwise, the disc will remain in sealing contact with the seat. In this manner the valve functions as a dual check valve particularly suited for use in a dryer in the V3 position of FIG. 1. The spring constants of the springs may be chosen to establish an appropriate opening conditions, typically between about 3 and 5 psi differential across the sealing disc.

Turning now to FIG. 9, an alternative embodiment of a two-way valve 300 according to the invention is shown, with components similar in configuration or function to those valve described above being assigned corresponding 300-series numbers. In this embodiment, an L-shaped two-way valve is provided in which the support subassembly 330, which carries the sealing poppet 324, is secured to one of the flanges 313, rather than being attached directly to the pipe section 312, as is the case with the two-way valve 10 of FIG. 2. It will be appreciated that this arrangement not only permits a different piping configuration than that required for the valve of FIG. 2, but it also offers certain advantages in manufacturing. When the housing 12 of a large valve is rolled or cast rather than machined, as would typically be the case for larger size valves, the interior of the housing may be relatively rough. In order to properly seat a support subassembly, such as item 30 in FIG. 2, at least a portion of the interior of the housing might have to be machined to provide a smooth, sealable interface concentric with the valve seats. The embodiment of FIG. 9, avoids the need to machine the interior of the valve housing to assure proper alignment of the poppet 324 with the valve seat 320.

Describing the embodiment in FIG. 9 in more detail, the valve housing 312 comprises a standard tee-section 312a, to the branch of which is welded a conventional weld-neck flange 312b, with flanges 313, 314 held on opposite sides of the tee-section 312a by means of the rod assemblies 316. Gaskets 315 between the ends of the tee-section 312a and the flanges 313, 314 create a seal between the members. Flange 314 has a central opening 319 and further has a seat 320 disposed therein, while flange 313 is a blind flange. Consequently, an L-shaped two-way valve is provided, with flow between the opening in the weld-neck 312b and the flange opening 319.

As shown in FIG. 9, the subassembly 330 is comprised of two cylindrical halves 332a, 332b having their axial bores aligned. End cap 334 seals the outer end of cylinder block 332b, while the flange 313 serves to seal the outer end of cylinder block 332a. The end cap 334 may be secured to the support subassembly 330 by means of bolts (not shown) which extend through both cylindrical halves 332a, 332b of the support subassembly 330 and thread into blind holes (not shown) in the flange 313. In this manner, the bolts also serve to secure the support subassembly to the flange. In practice, six of such bolts, received in equally-spaced countersunk holes in the end cap 334, have served to secure together the various components of the subassembly 330 and to adequately support the subassembly 330 within the valve 312. O-rings, not specifically identified, seal between the various components.

Referring again to FIG. 9, in the illustrated subassembly 330 the abutting edges of the cylindrical halves 332a and 332b are relieved at their inside diameters so as to form a seat for the partition 335, such that the partition 335 is sealingly secured in the bore of the support subassembly 330. Extending through central openings in both the partition 335 and the end cap 334 is the reciprocably movable rod 323. As an alternative to the previously discussed embodiments, the rod 323 comprises two support shaft portions 323a, 323b secured together by a threaded stud shaft 323c. The rod 323 is held within the support subassembly 330 so as to be axially aligned with the seat 320 and has secured thereto the sealing poppet 324, movable into and out of contact with the edge of the seat 320, and pistons 336, 338, located in the interior of the support subassembly 330 on opposite sides of the partition 335. Again, O-rings are employed throughout to seal between the various chambers.

In the previously described embodiments, the poppets were located and secured on the rod by means of snap rings which forced the poppets into abutting engagement with a shoulder on the end of the rod. As illustrated in FIG. 9, the sealing disc 324 is secured to support shaft 323b by means of a nut 327a threadably received on the end of the support shaft 323b. Previously, the pistons were located on and secured to the rod by sandwiching each piston between two snap rings. In the embodiment of FIG. 9, piston 336 is secured to the support shaft 323a by means of a nut 327b received on the end of the support shaft 323a, while the interior ends of the support shafts 323a, 323b locate the piston 338 on the stud shaft 323c. It will be appreciated that these threaded methods of securing the poppets and pistons to the rod and holding them perpendicular may offer certain advantages over the snap ring, and mating groove system employed in the previous embodiments.

As with the FIG. 2 embodiment, the pistons 336, 338 in the FIG. 9 embodiment are spaced from one another in chambers on opposite sides of the partition 335 such that they may be selectively pneumatically driven in tandem to move the poppet 324 into and out of contact with the seat 320. To this end passage 337a serves to interconnect chambers 344 and 345, while the other passage 337b serves to interconnect chambers 339 and 340. The flange 313 has two ports 350 aligned with the passages 337b through which pneumatic control signals may be introduced into the chamber portions 339, 340, on the one hand, and chamber portions 344, 345, on the other hand.

Turning now to FIGS. 10 and 11, an alternative embodiment of a three-way valve 400 according to the invention is shown, with components similar in configuration and function to the valves described above being assigned corresponding 400-series numbers. As illustrated, FIG. 11 is a multi-planar view taken along the section line 11—11 in FIG. 10, the section line having a 90° break at the centerline of the valve. As an alternative to the embodiment shown in FIG. 5, the three-way valve 400 shown in FIGS. 10 and 11 has its support subassembly suspended on rods between the flanges. This arrangement is especially advantageous in the case of large valves, e.g., 8-12 inches and even larger, since it obviates the need for the support subassembly to extend to and be affixed to the sidewall of the valve housing, as in FIG. 6.

As shown in FIGS. 10 and 11, the support subassembly 430 is suspended within the valve housing 412 by means of support bars 470 which are secured to the end caps 434 of the subassembly 430 by means of screws 470a. The support bars 470 are, in turn, carried on rods 471 which are seated in blind holes 472 located on the interiors of flanges 413 and 414. To properly locate and orient the support bars 470, and thus the subassembly 430, within the valve housing 412 so that the sealing discs 424 will sealingly contact the openings 418, 419, each rod 471 carries three sleeve members 474. The sleeves 474 are sized in length so as to properly locate the support subassembly 430 along the length of the rods 471, with Belleville washers 475, located on the rods 471 in abutting contact with the ends of the sleeves 474 on opposite sides of the support bars 470, thus taking up any slack along the rods 471 between the sleeves 474 due to tolerance differences.

In the embodiment of FIGS. 10, 11, the pneumatic signals for driving the piston 436 back and forth within the subassembly 430 are introduced through tubes 476 extending between fittings 450 at the valve housing 412 and fittings 480, located at any convenient exterior surface of the valve.

I claim as my invention:

1. A valve for directing gas in a compressed gas desiccant drier system having two desiccant beds which are sequentially placed on stream so that one desiccant bed dries the compressed gas while the other desiccant bed is being regenerated comprising, in combination, a housing having at least two openings to allow for the ingress and egress of compressed gas; a seat for at least one of the openings and integral therewith; a support secured to the interior of the housing and comprising a cylindrical chamber portion in the interior thereof; a rod axially aligned with the seat and being slidably carried by the support, said rod comprising a piston integral therewith and slidably positioned within the cylindrical chamber portion so as to be isolated from the compressed gas, the piston isolating a first portion of the chamber on one side thereof from a second portion of the chamber on the other side thereof; a disc-like sealing member corresponding to each seat sized larger than the passageway through the seat, the sealing member being disposed on the rod and movable with respect to the seat between sealing face-to-face contact therewith to prevent flow of gas through the passageway and a sufficient distance away from the seat to allow substantially unimpeded flow of gas through the valve; and means communicating with each cylindrical chamber portion for introducing to and exhausting fluid from the first and second chamber portions, so that as pressurized fluid is selectively admitted into one chamber portion and exhausted from the other, the piston, rod and sealing member are selectively moved into the sealing and flow-through positions.

2. The valve of claim 1 wherein the number of openings is two and the number of seats and sealing members is one.

3. The valve of claim 2 wherein the support further comprises a second chamber concentric with the rod and the rod further comprises a second piston slidably mounted within the second chamber of the support, the second piston isolating a first portion of the second chamber on one side thereof and a second portion of the second chamber on the other side thereof; the valve further comprising means communicating with each second chamber portion for introducing and exhausting fluid from the second chamber portions, so that as pressurized fluid is simultaneously selectively admitted into one chamber portion of both chambers and exhausted from the other portion of both chambers, the pistons, rod and sealing member are selectively moved into the sealing and flow-through positions.

4. The combination of claim 2 wherein the housing is tee shaped and further comprises flanges at opposite ends of the cross of the tee, the flanges being removably held in place by tie rods located exterior of the valve housing, and the support is secured to the interior of the valve housing on one of the flanges thus forming an L-shaped flow path.

5. The valve of claim 1 wherein the number of openings is three and the number of seats and sealing members is two, the seats being axially aligned; the rod being sized to extend through both sides of the support with a sealing member disposed on each end thereof, so that when one sealing member and seat are engaged to prevent flow of compressed gas through one of the openings, flow is permitted through the housing through the seat of the other opening.

6. The valve of claim 1 wherein the housing further comprises flanges at each end, the flanges being removably held in place by tie rods located exterior of the valve housing.

7. The combination of claim 6 wherein the support is suspended in the interior of the valve housing by means including rods located interior of the valve housing.

8. The valve of claim 1 wherein the support is secured to the interior of the valve housing with threaded members insertable through the valve housing and removable from the exterior of the valve housing.

9. The valve of claim 1 wherein the support is secured to the interior of the valve housing with threaded members insertable through the valve housing and removable from the exterior of the valve housing, the threaded members further comprising the communicating means.

10. A valve for directing gas in a compressed gas desiccant drier system having two desiccant beds which are sequentially placed on stream so that one desiccant bed dries the compressed gas while the other desiccant bed is being regenerated comprising, in combination, a housing having at least two openings to allow for the ingress and egress of compressed gas; a seat for at least one of the openings and integral therewith; a support secured to the interior of the housing and comprising a cylindrical chamber portion in the interior thereof; a rod axially aligned with the seat and being slidably carried by the support, said rod comprising a piston integral therewith and slidably positioned within the cylindrical chamber portion, the piston isolating a first portion of the chamber on one side thereof from a second portion of the chamber on the other side thereof; a wiper disposed on the support at the point where it is penetrated by the rod to wipe the rod free of contaminants as it is withdrawn into the support; a disc-like sealing member corresponding to each seat sized larger than the passageway through the seat, the sealing member being disposed on the rod and movable with respect to the seat between sealing face-to-face contact therewith to prevent flow of gas through the passageway and a sufficient distance away from the seat to allow substantially unimpeded flow of gas through the valve; and means communicating with each cylindrical chamber portion for introducing to and exhausting fluid from the first and second chamber portions, so that as pressurized fluid is selectively admitted into one chamber portion and exhausted from the other, the piston, rod and sealing member are selectively moved into the sealing and flow-through positions.

11. A valve for directing gas in a compressed gas desiccant drier system having two desiccant beds which are sequentially placed on stream so that one desiccant bed dries the compressed gas while the other desiccant bed is being regenerated comprising, in combination, a housing having three openings to allow for the ingress and egress of compressed gas, two of which are axially aligned; valve seats integral with the two axially aligned openings, the seats having a rod axially aligned therewith, said rod being slidably carried by a support on the interior of the valve housing, the support being secured to the interior of the housing; a disc-like sealing member corresponding to each seat and being sized larger than the passageway through the seat, the sealing members being slidably disposed on opposite ends of the rod and movable with respect to their respective seats between sealing face-to-face contact therewith to prevent flow of gas through the passageway and a sufficient distance away from the respective seats to allow substantially unimpeded flow of gas through the valve; and biasing means to urge the sealing members into sealing contact with their respective seats, so that the sealing members prevent flow of gas through the respective seat unless the pressure exerted on the sealing member in opposition to the biasing means is sufficient to unseat the sealing member.

12. The valve of claim 11 wherein axial movement of the rod relative to the support is resiliently restrained to cushion the actuation of the sealing members when they are dislodged from the seats due to pressure exerted on the sealing members by the flow of compressed gas through the housing.

13. The valve of claim 11 wherein a wiper is disposed on the support at the point where it is penetrated by the rod to wipe the rod free of contaminants as it is withdrawn into the support.

14. The valve of claim 11 wherein the housing further comprises flanges at each end, the flanges being removably held in place by tie rods located exterior of the valve housing.

15. The valve of claim 11 wherein the support is secured to the interior of the valve housing with threaded members insertable through the valve housing and removable from the exterior of the valve housing.

* * * * *